US010216551B1

United States Patent
Jha et al.

(10) Patent No.: US 10,216,551 B1
(45) Date of Patent: Feb. 26, 2019

(54) USER INFORMATION DETERMINATION SYSTEMS AND METHODS

(71) Applicant: Intertrust Technologies Corporation, Sunnyvale, CA (US)

(72) Inventors: Sanjiv Kumar Jha, Sunnyvale, CA (US); Vipul Agrawal, Sunnyvale, CA (US); Prisdha Dharma, San Francisco, CA (US); Rehan Asif, Sunnyvale, CA (US); Nilanjan Sengupta, Sunnyvale, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 33 days.

(21) Appl. No.: 15/445,823

(22) Filed: Feb. 28, 2017

Related U.S. Application Data

(60) Provisional application No. 62/302,002, filed on Mar. 1, 2016, provisional application No. 62/302,043, filed on Mar. 1, 2016, provisional application No. 62/302,033, filed on Mar. 1, 2016.

(51) Int. Cl.
*G06F 9/54* (2006.01)
*G06F 11/30* (2006.01)
*G06F 11/34* (2006.01)

(52) U.S. Cl.
CPC ............ *G06F 9/542* (2013.01); *G06F 11/302* (2013.01); *G06F 11/3476* (2013.01)

(58) Field of Classification Search
CPC ............................. G06F 9/542; G06F 11/3476
See application file for complete search history.

(56) References Cited

U.S. PATENT DOCUMENTS

| | | | | |
|---|---|---|---|---|
| 2011/0161331 | A1* | 6/2011 | Chung | G06Q 30/02 707/751 |
| 2011/0295696 | A1* | 12/2011 | Flinn | G06Q 30/02 705/14.66 |
| 2012/0310739 | A1* | 12/2012 | Watfa | G06Q 30/0267 705/14.58 |
| 2015/0100688 | A1* | 4/2015 | Richardson | G06N 5/04 709/224 |

\* cited by examiner

*Primary Examiner* — Charles E Anya
(74) *Attorney, Agent, or Firm* — Finnegan, Henderson, Farabow, Garrett & Dunner, LLP

(57) ABSTRACT

This disclosure relates to systems and methods for determining information associated with a user. In certain embodiments, various attributes, interest, and/or other demographic information related to a user may be determined based on information may be obtained from personal electronic devices associated with the user. User attribute models used to predict user attributes and/or demographics may be generated and trained based on inferred user interests and available label data. In some embodiments, information reflecting which applications and/or types of applications are installed and/or frequently used by a user on their personal electronic devices may be used in connection with determining interests associated with the user. Further embodiments of the systems and methods disclosed herein relate to determining various information associated with a user based on location information indicative of a user's location obtained from one or more personal electronic devices associated with the user.

10 Claims, 12 Drawing Sheets

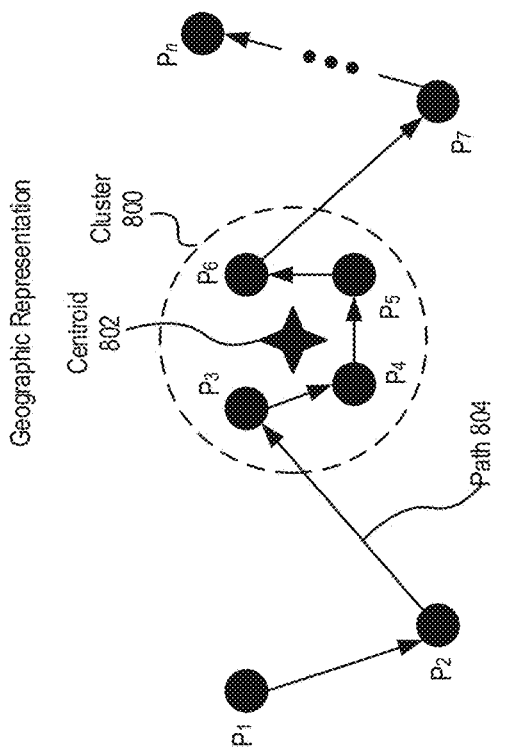
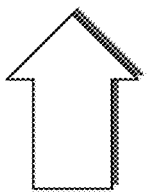
Figure 8

USER INFORMATION DETERMINATION SYSTEMS AND METHODS

RELATED APPLICATIONS

This application claims the benefit of priority under 35 U.S.C. § 119(e) to U.S. Provisional Application No. 62/302,002, filed Mar. 1, 2016, and entitled "USER ATTRIBUTE DETERMINATION SYSTEMS AND METHODS," U.S. Provisional Application No. 62/302,033, filed Mar. 1, 2016, and entitled "USER INFORMATION DETERMINATION SYSTEMS AND METHODS," and U.S. Provisional Application No. 62/302,043, filed Mar. 1, 2016, and entitled "USER INTEREST DETERMINATION SYSTEMS AND METHODS," all of which are hereby incorporated by reference in their entireties.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for determining information relating to a user. More specifically, the present disclosure relates to systems and methods for determining demographic information, interest information, attribute information, and/or location information associated with a user.

The use of the Internet is becoming increasingly intrinsic to people's daily lives as more personal electronic devices are interconnected. This includes phones, cameras, e-book readers, TVs, automobiles, and even appliances (e.g., thermostats, refrigerators, bathroom scales, etc.). Personal electronic devices often include a variety of sensors that may provide information regarding device location, motion, and/or other activities.

As users interact with personal electronic devices and services, including mobile electronic devices, the Internet and other connected services, a variety of information may be collected. For example, device usage information may be obtained from personal electronic devices indicative of a user's interaction with the devices and/or various applications or features executing thereon. In addition, a variety of environmental information may be obtained from sensors included in a personal electronic device indicative of user and/or device location, motion, and/or other activities.

Systems and methods disclosed herein relate to determining various attributes, interest, and/or other demographic information related to a user based on information obtained from personal electronic devices associated with the user. In some embodiments, user information obtained from personal electronic devices may be used to infer various user interests. User attribute models used to predict user attributes and/or demographics may be trained based on the inferred user interests and available label data, which may comprise relatively verified user attribute and/or demographic information such as, for example, information volunteered by a user. Inferred user interests without associated label data may be compared against the trained user attribute models to determine likely user attributes and/or demographics associated with the user.

In certain embodiments, information relating to a user including user interest information may be identified based on usage information obtained from personal electronic devices associated with the user. Understanding a user can be helpful in inferring their interests/demographics and predicting their actions in the future. For example, if a user is a sports fan, they may frequently use popular sports applications on their personal electronic devices. Similarly, a user that frequently uses women fashion and shopping applications on their personal electronic devices may likely be female. Such insights may be used in a variety of ways, including targeted advertising where groups of users having certain interests may be targeted in particular campaigns, and consumer product development where actions may be taken that are more responsive to user interests.

Obtaining certain application information from mobile electronic devices may be difficult, as data associated mobile applications may be included in a number of logical data silos. For example, in some circumstances, even an application developer may not be able to directly access information relating to how and/or what the user does with a particular application.

Embodiments of the disclosed systems and methods may use information reflecting which applications and/or types of applications are installed and/or frequently used by a user on personal electronic devices, generally referred to herein as usage information, in connection with determining interests associated with the user. In some embodiments, interests associated with a user may be inferred based on the usage information using attribute information relating to the applications (e.g., indications from application stores of a type and/or category of an application and/or the like). Consistent with the disclosed embodiments, such application attribute information may be generally used as a way of identifying a likely user interest based on usage information relating to a particular application.

Further embodiments of the systems and methods disclosed herein relate to determining various information associated with a user based on location information indicative of a user's location obtained from one or more personal electronic devices associated with the user. In some embodiments, the location information may comprise, without limitation, one or more of latitude information, longitude information, and/or Internet Protocol ("IP") address information associated with the one or more personal electronic devices. In certain embodiments, received location information may be utilized to identify one or more points of interest ("POIs") and/or other personal information related to the user. For example, a location associated with the user's home and/or place of work may be determined based on received location information indicating frequent visits to a particular location and/or area at certain times. Based on the one or more determined POIs and/or other personal information, various demographic information associated with the user may be identified and/or otherwise inferred. Furthermore, content (e.g., advertisements) may be more efficiently targeted based on the one or more determined POIs and/or other personal information.

BRIEF DESCRIPTION OF THE DRAWINGS

The inventive body of work will be readily understood by referring to the following detailed description in conjunction with the accompanying drawings, in which:

FIG. 8 illustrates identification of clustered locations associated with a user consistent with embodiments of the present disclosure.

DETAILED DESCRIPTION

A detailed description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of any method disclosed herein do not necessarily need to be executed in any specific order, or even sequentially, nor need the steps be executed only once, unless otherwise specified.

Embodiments of the disclosed systems and methods relate to determining attribute, interest, location and/or other demographic information associated with a user based on information obtained from personal electronic devices associated with the user. Information related to a user and/or an associated device may be collected by a trusted service from one or more devices associated with the user. As detailed below, collected user and/or device information may be used to, among other things, train models associated with a user, determine user interests, demographic information, and/or other attributes, and/or identify locations associated with and/or otherwise related to a user.

Figure 1:
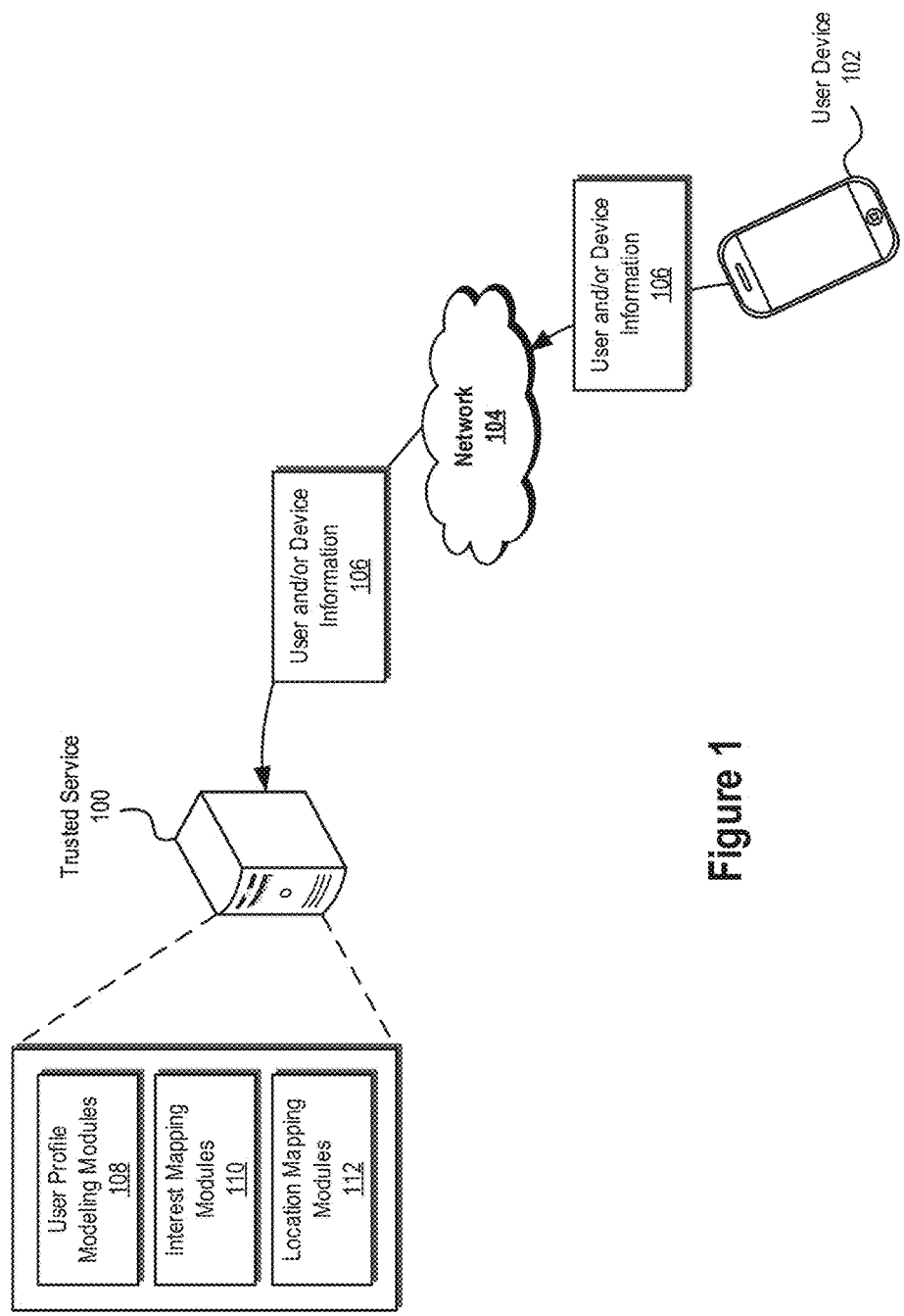
FIG. 1 illustrates an exemplary architecture for determining information relating to a user based on received user and device information consistent with embodiments of the present disclosure.

FIG. 1 illustrates an exemplary architecture for determining information relating to a user consistent with embodiments disclosed herein. The architecture may include a trusted service system 100 communicatively coupled with a user device 102, which may comprise a personal and/or mobile electronic device associated with a user. The trusted service 100 may provide a variety of functions including, without limitation, functions associated with determining attributes associated with a user and/or a device, training models, mapping and/or otherwise determining user interests, analyzing application, user, and/or other device usage information, POI identification, and/or targeted content delivery and/or advertising services The trusted service 100, user device 102, and/or one or more other systems and/or services (not shown) may be communicatively coupled using a variety of networks 104 and/or network connections. In certain embodiments, the network 104 may comprise a variety of network communication devices and/or channels and may utilize any suitable communications protocols and/or standards facilitating communication between the trusted service, user device, and/or one or more other systems and/or services. The network 104 may comprise the Internet, a local area network, a virtual private network, and/or any other communication network utilizing one or more electronic communication technologies and/or standards (e.g., Ethernet or the like). In some embodiments, the network 104 may comprise a wireless carrier system such as a personal communications system ("PCS"), and/or any other suitable communication system incorporating any suitable communication standards and/or protocols. In further embodiments, the network 104 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 104 may incorporate one or more satellite communication links. In yet further embodiments, the network may utilize IEEE's 802.11 standards, Bluetooth®, ultra-wide band ("UWB"), Zigbee®, and/or any other suitable standard or standards.

The trusted service 100, user device 102, and/or one or more other systems and/or services may comprise a variety of computing devices and/or systems, including any computing system or systems suitable to implement embodiments of the various systems and methods disclosed herein. The connected devices and/or systems 100, 102 may comprise a variety of computing devices and systems, including laptop computer systems, desktop computer systems, server computer systems, distributed computer systems, smartphones, tablet computers, vehicle computer systems (e.g., vehicle media and navigation systems and/or the like), wearable computing devices (e.g., smartwatches, etc.), and/or the like.

In certain embodiments, the trusted service 100, user device 102, and/or one or more other systems and/or services may comprise at least one processor system configured to execute instructions stored on an associated non-transitory computer-readable storage medium. As discussed in more detail below, the trusted service 100, user device 102, and/or one or more other systems and/or services may further comprise a secure processing unit ("SPU") configured to perform sensitive operations such as trusted credential and/or key management, secure policy management, and/or other aspects of the systems and methods disclosed herein. The trusted service 100, user device 102, and/or one or more other systems and/or services may further comprise software and/or hardware configured to enable electronic communication of information between the devices and/or systems via the network 104 using any suitable communication technology and/or standard.

As the user interacts with the user device 102 (e.g., consumes content and/or interacts with applications and/or services) and/or services, the user device 102 may generate various information 106 relating to the device and/or the user. User and/or device information 106 may be directly provided by a user of the user device 102 by, for example, interacting with an application and entering certain user-volunteered information. For example, in registering a user device 102, a user may voluntary provide personal demographic information to a device manufacturer and/or service provider.

In further embodiments, user and/or device information 106 may be passively obtained by monitoring a user's activity and/or interactions with the user device 102. Such information 106 may include, without limitation, one or more of demographic information about the user (e.g., age, gender, ethnicity, income, group affiliations, etc.), usage history and preferences of the user (e.g., application usage and/or application feature usage), information about the user's devices, content preference information (e.g., preferred genres, artists, etc.), information about the user or the user's environment (e.g., time of day, global positioning system ("GPS") coordinates and/or other location, etc.), and/or any other available information relating to a user and/or an associated user device 102 that may be obtained.

As illustrated, the user device 102 may transmit information 106 relating to the user and/or device to the trusted service 100 via the network 104. Although illustrated as being transmitted from a user single device 102, it will be appreciated in that further embodiments, user and/or device information 106 may be transmitted to the trusted service by a variety of devices.

The trusted service 100 may provide a variety of services based on the received user and/or device information 106, including any of the services described herein. For example, as detailed below, the trusted service 100 may provide services relating to user profile modeling (e.g., determining attribute and/or demographic information associated with a user) using one or more user profile modeling modules 108 executing thereon, services relating to user interest mapping using one or more user interest mapping modules 110 executing thereon, and/or location mapping services (e.g., identifying locations associated with and/or of interest to a user using one or more location mapping modules 112 executing thereon. Although illustrated as separate modules 108-112, it will be appreciated that services implemented by various modules 108-112 executed by the trusted service 100 may be included in a single executable module and/or any suitable combination of executable modules.

In certain embodiments, based on identified user interests, attributes, locations, demographics, and/or the like, content (e.g., advertisements) may be efficiently targeted to a particular user. For example, the systems and methods described herein can be used in connection with advertisement matching and/or advertisement targeted technologies such as those described in commonly assigned co-pending U.S. patent application Ser. No. 12/785,406, filed May 21, 2010 ("the '406 application"), which is incorporated herein by reference in its entirely.

It will be appreciated that a number of variations can be made to the architecture and relationships presented in connection with FIG. 1 within the scope of the inventive body of work. For example, without limitation, in some embodiments, some or all of the functions performed by the user device 102 may be performed by the trusted service 100. Similarly, some or all of the functions performed by the trusted service 100 may be performed by the user device 102. Thus it will be appreciated that FIG. 1 is provided for purposes of illustration and explanation, and not limitation.

User Profile and Interest Modeling

Consistent with embodiments disclosed herein, user information received from personal electronic devices associated with a user may be used to infer various user attributes and/or demographics with relatively high accuracy. In certain embodiments, user label data, which may comprise relatively verified and/or accurate user attribute and/or demographic information (e.g., information volunteered by a user), and associated user information may be used to train user attribute models that associate particular user interests with user attributes and/or demographic information. New user information may be used to infer various associated user interests, which may be compared against the trained user attribute models to determine likely user attribute and/or demographic information.

Embodiments disclosed herein may allow for determination of user attribute and/or demographic information with relatively high accuracy based on obtained user information. By training user attribute models, generic representations associating user interests and likely associated attribute and/or demographic information may be generated. In some embodiments, a variety of user attribute models may be generated. For example, generic attribute models corresponding to male and female users may be generated. Inferred interests associated with a new user may be compared with interest information associated with the attribute models to identify a model which most closely resembles the user's inferred interests, and the corresponding attribute (e.g., male or female) associated with the closely matching model may be associated and/or otherwise assigned to the user.

Figure 2:
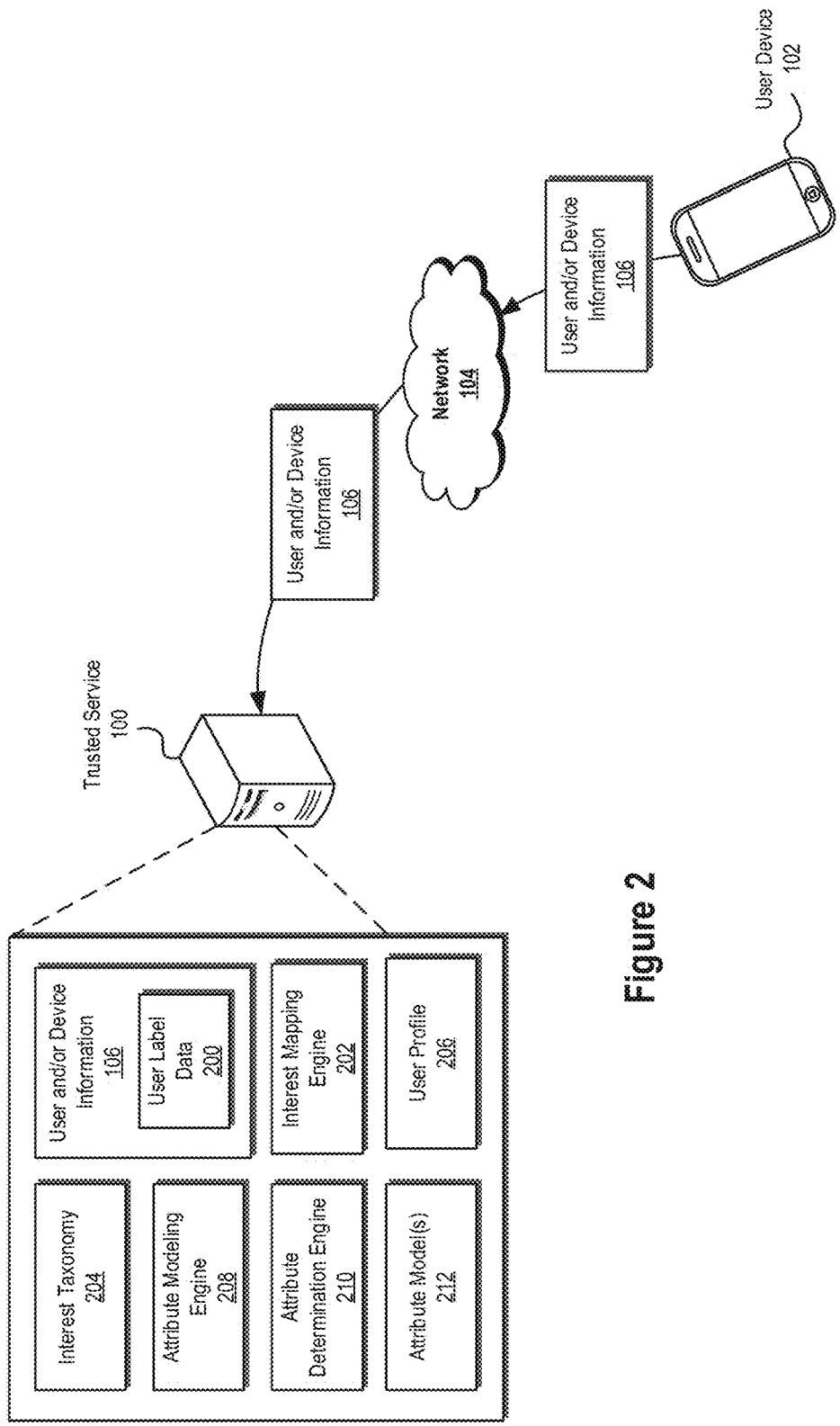
FIG. 2 illustrates a trusted system for determining user attribute information consistent with embodiments of the present disclosure.

FIG. 2 illustrates a trusted system for determining user attribute information consistent with embodiments of the present disclosure. As shown, a trusted service 100 may receive user and/or device information 106 from a user device 102. Based on the received information, the trusted service 100 may provide a variety of functions including, without limitation, functions associated with determining attributes associated with the user, training user attribute models, and/or mapping user interests.

In at least one example, based on received user and/or device information 106 that includes user label data 200, which may comprise relatively verified and/or accurate user attribute and/or demographic information (e.g., information volunteered by a user or the like), user attribute models may be trained to associate user interests inferred from the user information 106 with specific attribute and/or demographic information included in the available label data. Future user information 106 that does not include label data 200 may be used to infer user interests, which may then be compared with the trained user attribute models to determine likely attributes and/or demographic information for the associated users.

An interest mapping engine 202 executing on the trusted service may be configured to, among other things, map and/or otherwise associate interests with a user based on received user information 106. For example, if received user information 106 indicates a user accesses a sports-related application frequently, it may be inferred that the user has an interest in sports. In some embodiments, the interest mapping engine 202 may use an interest taxonomy 204 in connection with mapping user interests based on received user information 106. The interest taxonomy 204 may include a large variety of classified interests and/or concepts and/or define certain relationships between the same. In some embodiments, the interest taxonomy 204 may have a hierarchical structure. Relationships defined between interests and/or concepts included in the interest taxonomy 204 may be weighted in a manner indicative of a strength and/or degree of association.

A variety of interests may be included in the interest taxonomy 204 including, without limitation, one or more of the following: deals, discounts, fitness, movies, musical instruments, books, literature, magazines, tv shows, restaurants, political news, bars, computers, electronics, health, fitness, style, fashion, gardening, cooking, cuisines, news, finance, food, drinks, games, hotels, arts, entertainment, automotive, vehicles, beauty, grocery, home, garden, shopping, sports, tours, tourist destinations, law, government, public causes, computer games, video games, fine arts, photography, pets, animals, outdoor, real, estate, Cajun cuisine, creole cuisine, fast food, vegetarian, vegan, catalog shopping, antiques, collectibles, performing arts, lifestyle, parenting, spirituality, religion, high end shopping, productivity tools, weather, self inspiration, daily motivation, gps navigation, action games, adventure games, arcade games, board games, card games, casino gambling, dice games, puzzle games, role playing games, simulation games, sports games, trivia games, weight loss, pregnancy, green and/or eco friendly, science, dating, social games, public transportation, hobbies interests, children's games, food groups, basketball, personal finance, nutrition, media, videos, men's health, women's health, footwear, astrology, medical technology research, soccer, blogs, babies, toddlers, accounting, celebrities, entertainment, humor, visual art design, arts, crafts, biking, hiking, camping, bed, bath, interior decorating, remodeling, government, casual dating, longterm dating, wholesale, apartments, runway fashion, battery management, communication, phone-voip, messaging, browser, email, cloud-storage, computer and/or mobile device security, auto repair, bicycles, accessories, campers, recreational vehicles, e-books, business, services, K-12-education, adult education, language learning, parent of teenagers, banking, credit lending, investing, entrepreneurial, finance, candy, sweets, fine dining, word games, broadcast network news, journalism, sports, news, individual sports, team sports, winter sports, air travel, car rentals, taxis, vacations, apparel, classifieds, houses, property development, real estate agencies, fashion accessories, painting drawing, make up, spa, fantasy, historical fiction, horror, consulting, strategy games, driving racing games, fighting games, music/dance-games, diets, running, running, walking, bus, rail, mountains, ski resorts, vegetarian cuisine, buying/selling cars, comic books, drawing, sketching, guitar, international news, weddings, boardgames, puzzles, certified-pre-owned, healthy cooking, lowfat cooking, job searching, national news, scrapbooking, telecommuting, beadwork, action/adventure-films, pop music, rock music, comedy shows, women's shoes, united-kingdom, stocks, olympics, honeymoons getaways, and television.

In certain embodiments, inferred interests associated with a user may be included in a user profile 206. As discussed above, a variety of user and/or device information 106 may be used in connection with inferring user interests including, without limitation, application usage information, user label data 200, IP address information, location information, e-mail hash information, social media sharing and/or other information, browsing pattern information, offline data, and/or any other type of information that may be used to infer user interests. In some embodiments, various types of user and/or device information 106 may be parsed and/or processed upon receipt by the trusted service 100 for use in connection with the disclosed embodiments.

In some embodiments, a user profile 206 may comprise one or more user interest vectors, which may associate various inferred interests with a user. In some embodiments, the interest vector may comprise a weight and/or other indication reflective of a relative likelihood of each inferred interest being an actual interest of the user. An example of a user interest vector comprising a plurality of inferred interests and associated weights is provided below:

| Interest 1 | Interest 2 | Interest 3 | Interest 4 | . . . Interest N |
|---|---|---|---|---|
| 0.71 | 0.57 | 0.92 | 0.66 | 0.75 |

An attribute modeling engine 208 executing on the trusted service may be configured to, among other things, train and/or update one or more user attribute models 212 associating inferred interests with user label data 200. Label data 200 may be obtained from a variety of sources including, for example, based on information volunteered by users provided by one or more third parties (e.g., via social media profiles and/or other user-populated forms and/or questionnaires). Using the trained user attribute models 212, an attribute determination engine 210 executing on the trusted service may, among other things, determine one or more likely user attributes and/or other demographic information relating to a user based on interests inferred using associated user information 106.

As discussed above, by training user attribute models 212 that are not necessarily associated with a particular user, generic representations associating user interests and likely associated attributes and/or demographic information may be generated. In some embodiments, a variety of user attribute models 212 may be generated, each model associated with a different attribute or demographic. For example, trained and/or generic attribute models 212 that include attribute profile vectors corresponding to male and female users may be generated. An example of attribute profile vectors comprising a plurality of inferred interests and associated weights for generic male and female users is provided below.

| Average Male Vector: | | | | | |
|---|---|---|---|---|---|
| Interest 1 | Interest 2 | Interest 3 | Interest 4 | ... | Interest N |
| 0.56 | 0.57 | 0.73 | 0.94 | | 0.70 |

| Average Female Vector: | | | | | |
|---|---|---|---|---|---|
| Interest 1 | Interest 2 | Interest 3 | Interest 4 | ... | Interest N |
| 0.69 | 0.78 | 0.91 | 0.83 | | 0.56 |

Trained attribute models 212 generated based on label data 200 and associated inferred interests associated with a plurality of distinct users may be averaged to generate a generic attribute model associated with a particular attribute and/or demographic. In further embodiments, trained and/or generic attribute models 212 may be generated using other suitable methods, including, for example, using cluster centroid analysis methods and/or the like. In further embodiments, machine learning algorithms including, without limitation, decision trees, random forest, SVMs, logistic regression, and/or the like may be used to develop a suitable statistical model in connection with generating trained and/or generic attribute models.

As discussed above, using the trained user attribute models 212, an attribute determination engine 210 executing on the trusted service 100 may determine one or more likely user attributes and/or other demographic information relating to a user based on interests inferred using associated user information 106. In some embodiments, this analysis may comprise analyzing a user interest vector with one or more attribute profile vectors to determine relative distances. In certain embodiments, the distance metric may depend on a particular application. In some embodiments, a KL-divergence metric may be used for calculating distance. Various type of other distances can also be applied such as, for example, Euclidean, Mahalanobis, Manhattan, etc.

In certain embodiments, the distance may provide a measure of proximity/similarity of the user interest vector with the one or more attribute profile vectors, the smaller distance indicting the greater likelihood the user associated with the user interest vector is associated with a particular attribute and/or demographic. As an example, if the distance from a generic male attribute profile vector is 0.8 and a generic female attribute profile vector is 0.7, a user associated with the user interest vector is more likely to be female and may thus be classified as such. In some embodiments, the distance may also serve as a measure of confidence in a classification; the smaller the distance, the more confidence that the classification is correct.

Figure 3:
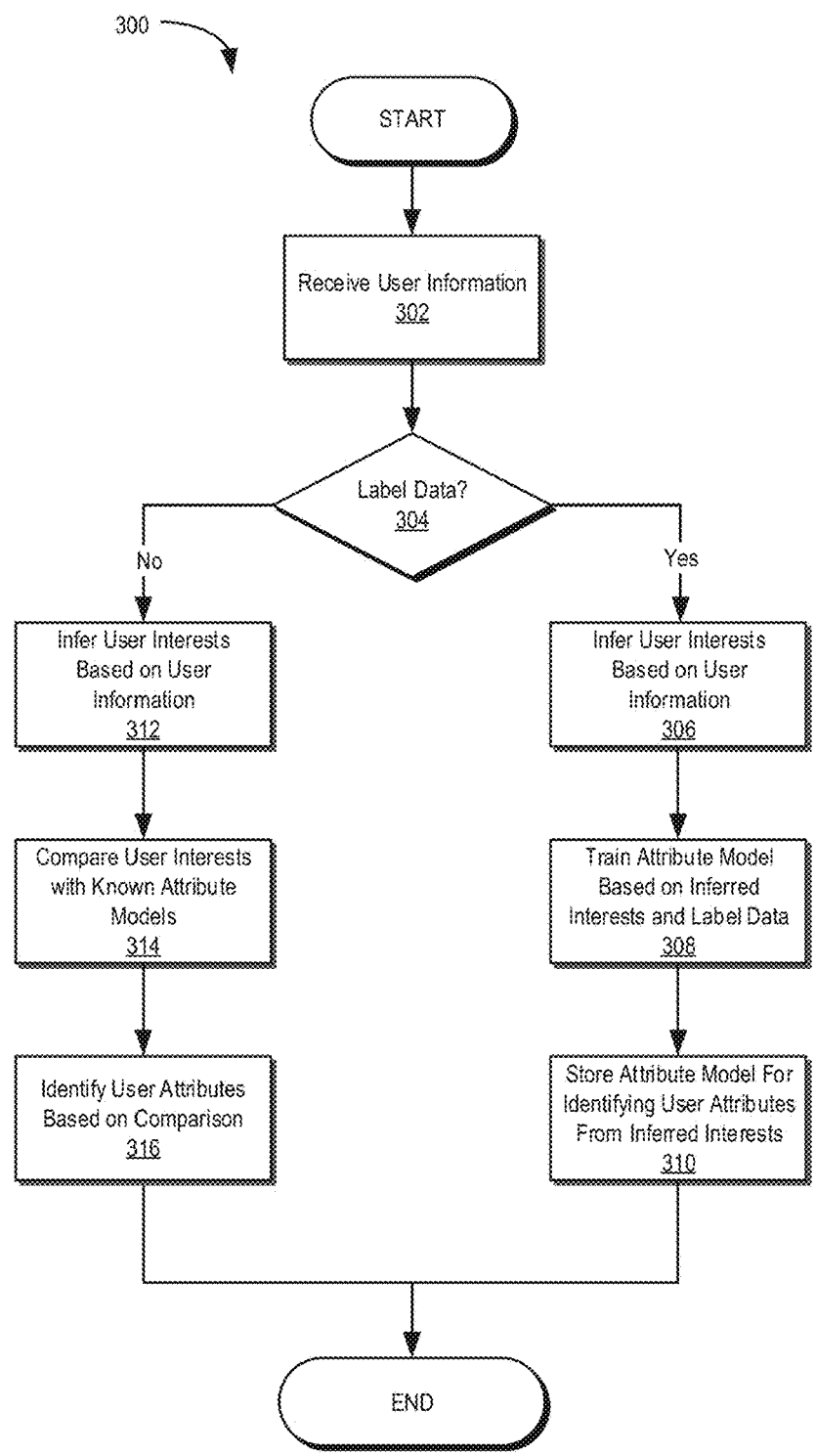
FIG. 3 illustrates a flow chart of an exemplary method of determining user attribute information consistent with embodiments of the present disclosure.

FIG. 3 illustrates a flow chart of an exemplary method 300 of determining user attribute information consistent with embodiments disclosed herein. The illustrated method may be implemented in a variety of ways, including using software, firmware, hardware, and/or any combination thereof. In certain embodiments, the method may be implemented by a trusted service and/or a user device as described above.

At 302, user and/or device information may be received by a trusted service from an electronic device associated with a user. As discussed above, the user and/or device information may comprise, among other things, information relating the usage of the device and/or features or applications executing thereon, label data comprising attribute and/or demographic information relating to the user, and/or any other type of user and/or device information.

A determination may be made at 304 whether the user and/or device information received at 302 comprises label data. If the user information comprises label data, user interests may be inferred based the application usage information (e.g., using interest taxonomy and/or the like) at 306. At 308, inferred interests and the available label data may be used to train a user attribute model associating user interests with user attributes and/or demographics. The trained user attribute model may be stored at 310 for use in connection with future user attribute and/or demographic determination operations where label data is not included in received user information.

If the user information does not include label data, the method 300 may proceed to 312, where user interests may be inferred based on the received user and/or device information. In some embodiments, user interests may be inferred by comparing the received user and/or device information with an interest taxonomy and/or the like. At 314, inferred user interests may be compared with interests included in one or more stored attribute models associating interests with user attributes and/or demographics. Based on the comparison, likely user attributes and/or demographics may be identified and associated with the user at 316.

Interest Determination Based on Device Usage Information

As discussed above, a variety of user and/or device information may be obtained related to a user as the user interacts with devices and services. In some embodiments, usage information relating to a user's frequency and/or duration of use of certain device applications and/or features thereof may be obtained from various user devices. In certain embodiments, such usage information may be obtained independently from application data managed in connection with logical data silos associated with individual applications. In some embodiments, application usage information may comprise time-series information indicating which applications and/or application features have been installed and/or otherwise used by a user and the time, frequency, and/or duration of such use.

Consistent with embodiments disclosed herein, application usage information received from personal electronic devices associated with a user may be used to infer various user interests. In certain embodiments, inferences identified based on the usage information may be mapped to one or more interest taxonomies. In some embodiments, the mapping of the applications to relevant interest taxonomies may use methods that assign one or more taxonomies to an application using machine learning techniques.

Certain embodiments disclosed herein may utilize application attribute information that may comprise information mapping applications to relevant taxonomies and/or categories. In some embodiments, these taxonomies and/or categories may reflect information that may supplement available indications from various application stores categorizing applications. Such information from application stores may include explicitly indicated application types and/or categories, or may be derived based on other available information such as application store descriptions of applications and/or the like. Based on this information, interests of associated users may be inferred based on the types and/or categories of applications they use.

Applications may be categorized on associated application stores, but such categorization may not necessarily be amenable to being directly used to understand user behavior. Moreover, manual curation of applications in application stores may be difficult in view of the large number of applications offered by the stores. Application stores may further not necessarily provide a weighted and/or relative indication of a relevance of an application to an assigned category and/or taxonomy. For example, a large number of applications may be associated with a particular category, but they may not necessarily be equally relevant to the category. Embodiments of the disclosed systems and methods may thus classify applications into relevant taxonomies with associated weights indicating their relative relevance. Based on these metrics (e.g., application usage information and application taxonomies and/or weights), a weighted association between a user and a particular interest taxonomy may be determined. The higher the associated weight between the weighted association and the particular interest taxonomy, the more likely the interest taxonomy reflects a user's actual interest.

Figure 4:
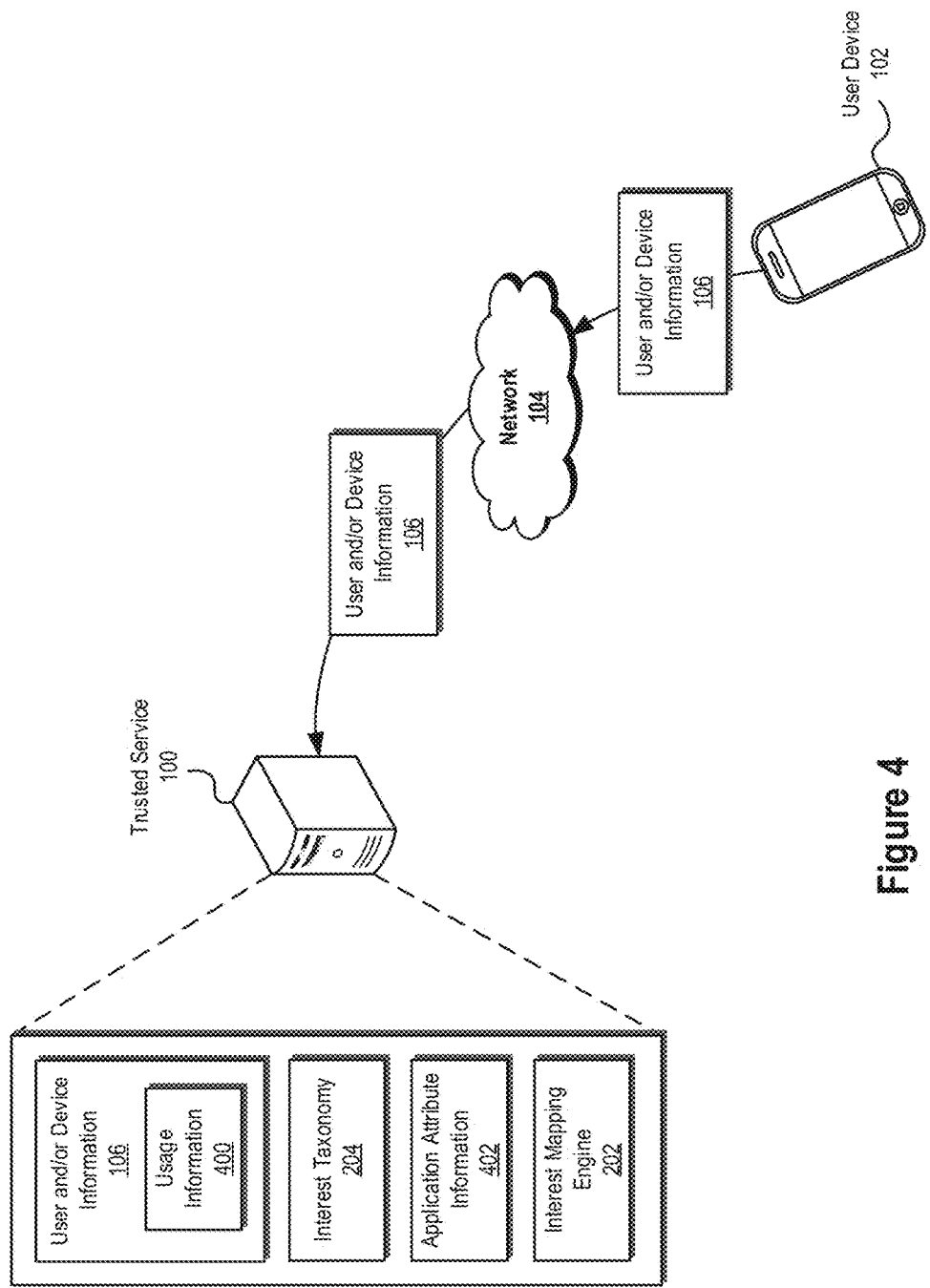
FIG. 4 illustrates a trusted system for determining user interests consistent with embodiments of the present disclosure.

FIG. 4 illustrates an exemplary architecture for determining user interests consistent with embodiments of the present disclosure. As shown, the trusted service 100 may receive user and/or device information 106 from a user device 102 that, in some embodiments, may comprise device and/or application usage information 400. Based on the received information, the trusted service 100 may provide a variety of functions including, without limitation, functions associated with determining interests associated with the user, analyzing application usage information, and/or targeted content delivery or advertising services.

As a user interacts with the user device 102 and/or applications associated with the same (e.g., consumes content and/or interacts with applications and/or services), the user device 102 may generate various usage information 400 relating to the device and/or the user. In some embodiments, such usage information 400 may be passively obtained by monitoring a user's activity with the device. For example, usage information 400 may be obtained by monitoring applications installed and/or used on a user's electronic device 102, and may comprise information relating to specific applications installed and/or used by the user, their time, frequency and/or duration of use, application features used by the user, and/or the like. In certain embodiments, application usage information may comprise time-series information.

The trusted service 100 may implement a variety of services including, without limitation, services associated with determining user interests associated with received user and/or device 106 information using, for example, an interest mapping engine 202 executing thereon, one or more interest taxonomies 204, and/or attribute information 402 associated with applications. In certain embodiments, application attribute information 402 may comprise information providing an indication of a type and/or category of an application and/or the like. For example, if received usage information 400 indicates that a user accesses a sports-related application frequently, it may be inferred that the user has an interest in sports. Various embodiments of methods for determining user interests based on received usage information 400 are discussed in more detail below.

Figure 5:
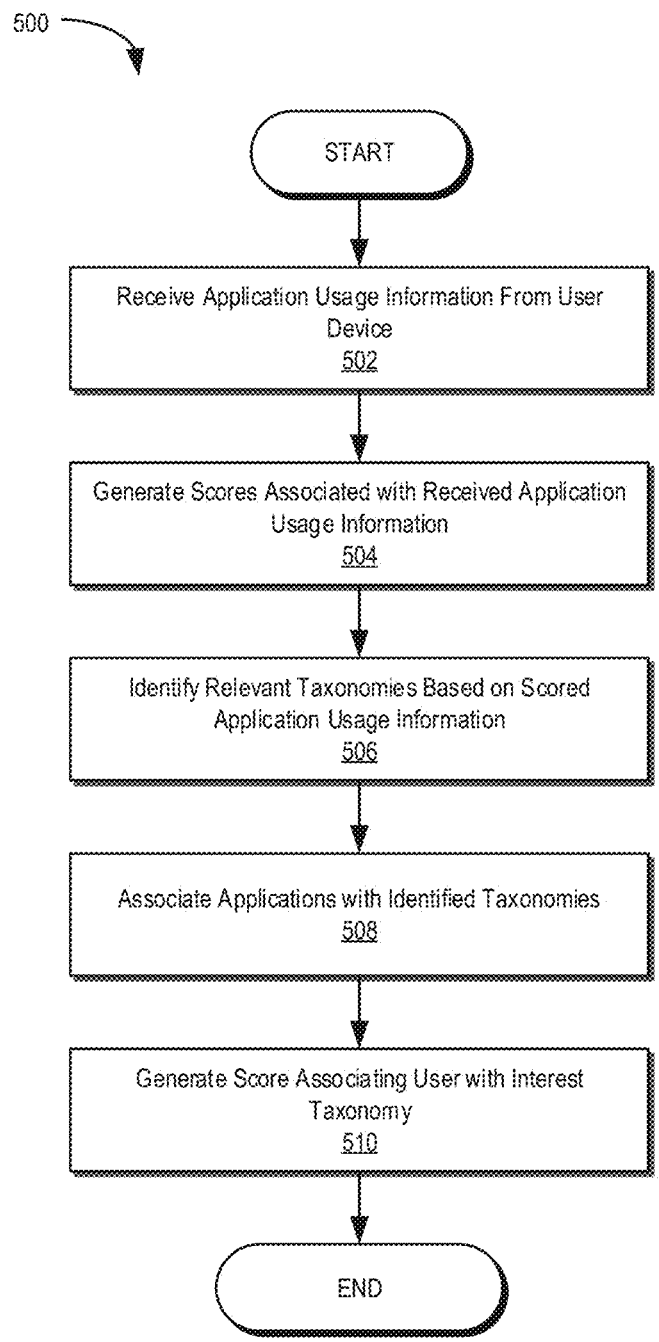
FIG. 5 illustrates a flow chart of an exemplary method of determining user interests based on application usage information consistent with embodiments of the present disclosure.

FIG. 5 illustrates a flow chart of an exemplary method 500 of determining user interests based on application usage information consistent with embodiments of the present disclosure. The illustrated method 500 may be implemented in a variety of ways, including using software, firmware, hardware, and/or any combination thereof. In certain embodiments, the method 500 may be implemented by a trusted service and/or a user device as described above.

As illustrated in FIG. 5, application usage information may be received by a trusted service at 502 from a device associated with a user. In some embodiments, the application usage information may comprise time-series information indicating which applications and/or application features have been installed and/or otherwise used by a user, and the time, frequency, and/or duration of such use. At 504, the received application usage information may be used to generate weighted indications and/or scores representing a relative usage of an application by a user. In certain embodiments, generating weighted indications and/or scores representing a relative usage of an application by a user may apply a windowed frequency of use—the frequency which an application is used in a particular time window (e.g., several hours a day). In some embodiments, this method may be more accurate than using raw frequency data.

In certain embodiments, a function used to generate weighted indications and/or scores may take the form:

$$W_t = g(W_{t-1}, W_{min}, P, T) \quad \text{Eq. 1}$$

where:
$W_t$=current weight
$W_{t-1}$=previous weight
$W_{min}$=minimum value of app usage score
P=Boolean presence of running application in this time window
T=time since application first seen
r=time since application last seen
and the exemplary function is:

$$g_1 = \begin{cases} 1 & \text{if } P = \text{True} \\ W_{t-1} \times D(T) & \text{if } P = \text{False and } r < 60 \text{ Days} \\ W_{min} & \text{if } r >= 60 \text{ Days} \end{cases} \quad \text{Eq. 2}$$

where D(T) is the decay rate for an application modeled by:

$$m = \max\left(\rho_{30days}, \rho T, \exp\left(-\frac{rf^2}{4}\right), \ldots\right) \quad \text{Eq. 3}$$

and $$D = \exp\left(-\frac{T_w}{T_1}\left(\frac{T_1}{T_2}\right)^m\right) \quad \text{Eq. 4}$$

where:
m=application momentum
$\rho_t$=density of application presence over time period of t days
f=frequency of application presence over app lifetime
$T_w$=duration of time window
$T_1$=time scale of decay with m=0, ~2 days
$T_2$=time scale of decay with m=1, ~1 month In certain embodiments, the above-described function used to generate weighted indications and/or scores may result in a refreshed weighted indication and/or score of 1 (e.g., a maximum) when an application event is seen in the time-series data (e.g., an instance of use and/or the like). If, however, an application event is not seen in a time window, its weight may be decayed at a rate which is based on a "momentum" of the application.

In some embodiments, an application's momentum may comprise a maximum of one or more sub-scores. In certain embodiments, the one or more sub-scores may be determined by one or more functions. The function(s) may include a function relating to a density of use in a particular period (e.g., the past 30 days or the like). For example, if a particular application is used frequently in the period, the decay rate may be relatively low. The function(s) may further include a function relating density of use of the application over its lifetime. This function may, for example, account for a smaller yet relatively recent period of inactivity of an application that has otherwise been regularly used for a longer period of time, and may prevent the decay rate from decaying too quickly. Additionally, the function(s) may include a recency frequency model which may allow for applications having a typical usage that fits a pattern along the lines of being used periodically (e.g., once a month) to contribute their inferences even though their overall usage may be relatively small as long as the standard pattern of usage remains constant to some degree.

The momentum of an application may be determined in a variety of ways. In certain embodiments, application momentum may comprise heuristic measures of user engagement and may be approximated. In some embodiments, determining approximate application momentum values may allow for use of a portion of available time-series data.

In certain embodiments, to calculate the density objects for each time window, the following recursive update may be used:

$$\rho_i(0) = P * \frac{T_w}{t} + \rho_i(-T_w)\frac{t - T_w}{t} \qquad \text{Eq. 5}$$

In some embodiments, an approximation of an application frequency of use may be used. For example, when an application event is seen in the time-series data (e.g., an instance of use and/or the like), the following update may be performed:

$$f \mathrel{+}= \frac{1 - rf}{t} \qquad \text{Eq. 6}$$
$$r = T_w$$

In certain embodiments, scored application usage information associated with a particular user may be used to correlate known and/or likely user interests with the associated applications. For example, at 506, relevant taxonomies may be identified for applications associated with the scored application usage information. Interest taxonomies may be identified based, for example, on comparing known and/or likely user interests (e.g., interests reflected in an existing user profile, identified based on available label data, and/or the like) with one or more interest taxonomies. Applications reflected in the scored application usage information may be associated with the identified taxonomies. Applications may be further associated with particular interest taxonomies based on available information regarding the applications (e.g., available application categories, descriptions, and/or the like). In this manner, relationships between applications and interest taxonomies may be generated at 508, which may be used in connection with identifying interests of other users associated with similar application usage information. For example, at 510, scored application usage information associated with a user may be compared with the relationships between applications and interest taxonomies generated at 510 to generate a weighted and/or scored indication of likely user interests based the application usage information The higher the associated weight between an interest taxonomy identified based on application usage information and the user, the more likely the interest taxonomy reflects a user's actual interest.

Location Determination Based on Usage Information

As users interact with personal electronic devices, including mobile electronic devices, the Internet and other connected services, information indicative of a user's location at a particular time or time period may be obtained. Such spatio-temporal information, which may be referred to herein as location information, may comprise latitude and/or longitude information obtained by a GPS included in and/or otherwise associated with a personal electronic device, IP address information associated with a personal electronic device, and/or any other information that may indicate and/or otherwise be used to infer a location of the user.

Consistent with embodiments disclosed herein, location information may be used to identify locations and/or areas frequently visited by a user and/or associated visiting times. For example, location information may indicate that a user visits one or more location points within a certain area at one or more times (e.g., locations within a 100 m distance and/or the like). In certain embodiments, such an area may be identified as a location cluster associated with the user, and may be associated with a particular POI that the user has visited.

In some embodiments, the area used to identify location clusters may depend, at least in part, on an accuracy associated with the location information used to identify a location cluster. For example, if location information used to identify location clusters comprises relatively accurate latitude and longitude information obtained from a GPS, the area used to identify the location clusters may be relatively small. Similarly, if location information used to identify location clusters comprises less accurate location information derived from IP address information, the area used to identify the location clusters may be relatively larger. In some embodiments, when multiple types of location information are used, different weights may be applied to various location points based on associated accuracy in connection with determining an area used to identify associated location clusters.

In certain embodiments, a specific location may be associated with an identified location cluster. For example, a centroid of the location points included in a location cluster may be identified. Such a centroid may, in general terms, represent a particular point visited by a user and/or an approximation thereof associated with the location cluster. For example, repeated visits to a user's home may result in location points forming a location cluster at/or near the user's home; the variability of the location points being associated with varied accuracy of the associated location information. An identified centroid location of a location cluster may thus represent a specific location and/or an approximation of a specific location of the user's home. Although embodiments are disclosed herein are discussed in connection with use of a centroid as a specific location and/or approximation thereof associated with a particular location cluster, it will be appreciated that a variety of other methods may be used to identify and/or otherwise associate a specific location with an identified location cluster.

Upon identifying a centroid of a location cluster, certain information relating to the centroid may be identified using one or more POI databases. In certain embodiments, the centroid may be compared with locations included in a POI database to identify one or more locations at and/or near the centroid and associated information relating to the locations. In some embodiments, the POI database may comprise an OpenStreetMap ("OSM") database. As an example, a centroid may be compared with locations included in an OSM database. The centroid may be determined to be at/or near a location in the OSM database associated with a residence. Based on such a determination, the location of the centroid may be determined to be a home location of the user and/or a likely home location of the user.

Embodiments disclosed herein may also be used in connection with identifying other various POIs and/or other personal information related to the user. For example, a location associated with a user's place of work may be identified based on received location information indicating frequent and/or regular visits to a particular location. In some embodiments, additional contextual information may be used in connection with identifying POI and/or other personal information relating to a user based on location information. For example, if a location cluster comprises location points that a user visits regularly in the evenings, a centroid of the location cluster may be more likely to be associated with the user's home than their workplace. Similarly, if a location cluster comprises location points that a user visits regularly during regular working hours, a centroid of the location cluster may be more likely to be associated with the user's place of work than their home.

In certain embodiments, based on determined POIs and/or other personal information, various demographic information associated with the user may be identified and/or otherwise inferred. For example, based on a zip code associated with a determined POI and/or information obtained from one or more demographic databases (e.g., databases including census data and/or the like), a likely ethnicity of a user and/or income of the user may be determined. In addition, content (e.g., advertisements) may be efficiently targeted to a particular user based on the one or more determined POIs and/or other personal information.

Figure 6:
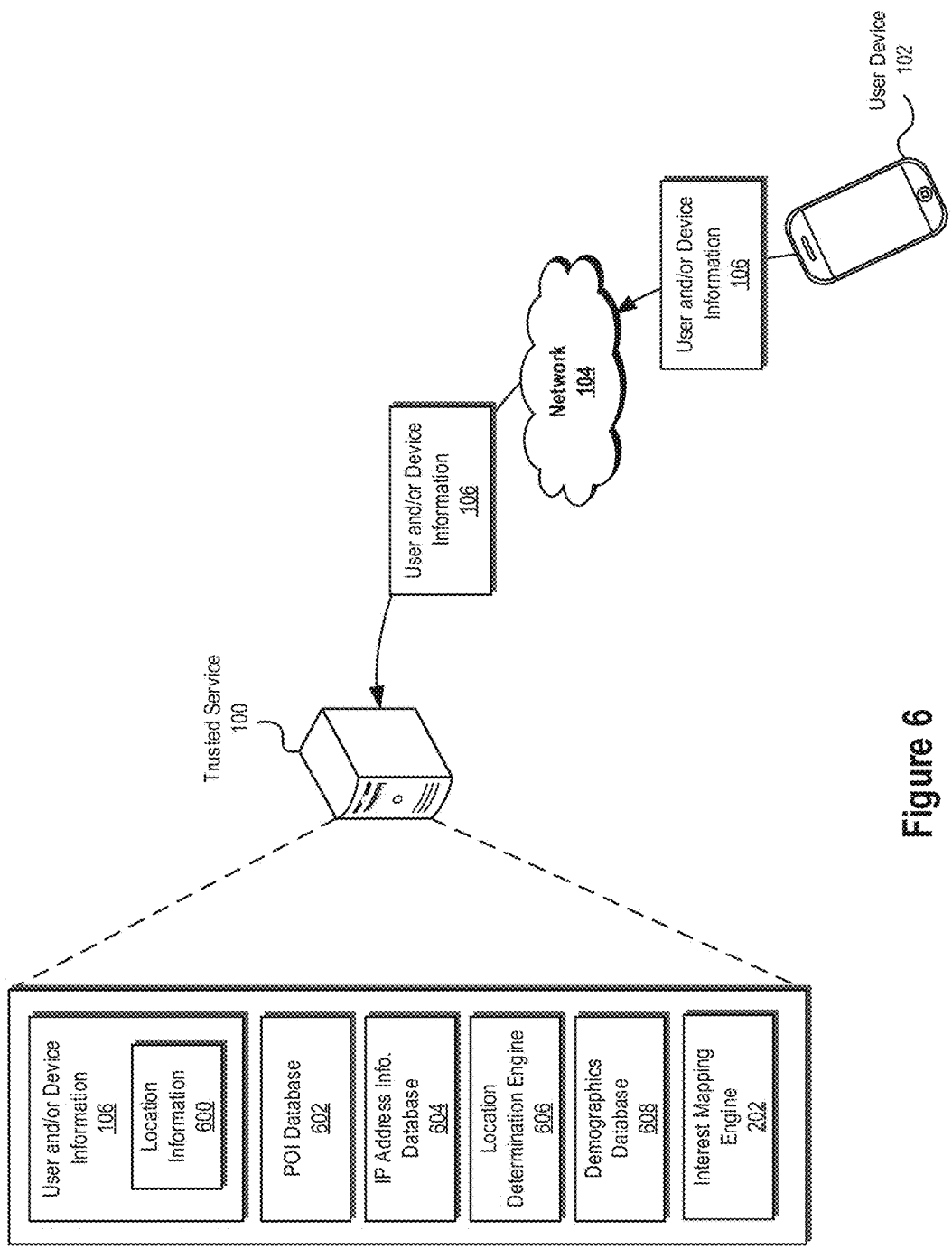
FIG. 6 illustrates a trusted system for determining location information associated with a user consistent with embodiments of the present disclosure.

FIG. 6 illustrates a trusted service 100 for determining location information associated with a user consistent with embodiments of the present disclosure. As shown, the trusted service 100 may receive user and/or device information 106 from a user device 102 that, in some embodiments, may comprise location information 600. Based on the received information, the trusted service 100 may provide a variety of functions including, without limitation, functions associated with identifying POIs based on location information received from the user device, interest mapping based on identified POIs and/or location information, and/or targeted advertising and content delivery services.

As the user interacts with the user device 102 (e.g., consumes content and/or interacts with applications and/or services), the user device 102 may generate various user and device information 106 that may include location information 600 relating to the device and/or the user. In certain embodiments, such location information 600 may be actively provided by a user of the device 102 (e.g., by interacting with an application and indicating their location at a particular time). In further embodiments, location information 600 may be passively obtained by monitoring a user's activity with the device 102. For example, longitude and/or latitude information and/or IP address information may be obtained by monitoring a user's interaction with various applications executing on the device 102.

In some embodiments, the user device 102 may include a variety of sensor systems configured to provide a variety of information relating to a user and/or their location. For example, the user device may include, without limitation, one or more accelerometers, GPS sensors, acoustic sensors, infra-red sensors, imaging sensors, gyroscopes, proximity sensors, light sensors, magnetometers, cameras, wireless communication systems, and/or any other suitable system and/or sensors for detecting and/or measuring information associated with the user device, its surroundings, and/or a user of the device. Certain sensors included in a user device 102 may comprise location-based sensors configured to generate location information 600 relating to a location of the user device 102 and/or an associated user. Further sensors may be activity-based and/or other environmental-sensors configured to provide information relating to a usage of the user device 102 and/or an environment proximate to the device. In certain embodiments, the one or more sensors of the device 102 may measure contextual information that may be used to determine and/or infer certain location information relating to the user (e.g., interests, regularly visited points of interest, etc.). For example, if an accelerometer of a device 102 indicates that the device 102 does not move on average between 11:00 PM and 6:00 AM every day, it may be inferred that the user typically sleeps between these hours and that a location of the device during these hours likely corresponds to a user's home.

A variety of databases 602, 604, 608 may be used in connection with the disclosed embodiments. For example, information included in a POI database 602 such as an OSM database, an IP address database 604 (e.g., a database associating IP addresses with certain locations and/or areas such as, for example, a Maxmind database), and/or a demographics database 608 associating particular demographic information with locations and/or areas may be utilized in connection with location, POI, and/or user demographic determinations consistent with the disclosed embodiments. In some embodiments, such databases 602, 604, 608 may be stored and/or otherwise managed by the trusted service 100. In other embodiments, the databases 602, 604, 608 may be accessed by the trusted service 100 from one or more third-party systems and/or services.

Based on received location information 600, the trusted service 100 may provide certain functions associated with POI and/or other user information determination methods consistent with the disclosed embodiments. For example, based on the received location information 600, the trusted service 100 may identify a home and/or work location of the user and/or certain demographic information relating to the user. A location determination engine 606 executing on the trusted service may be configured to, among other things, identify certain locations and/or POIs associated with the device and/or a user thereof based, at least in part, on the received location information 600. An interest mapping engine 202 executing on the trusted service may be configured to, among other things, map and/or otherwise associate interests and/or other demographic information with a user based, at least in part, on the received location information 600 and/or identified locations and/or POIs associated with the device and/or user.

Figure 7:
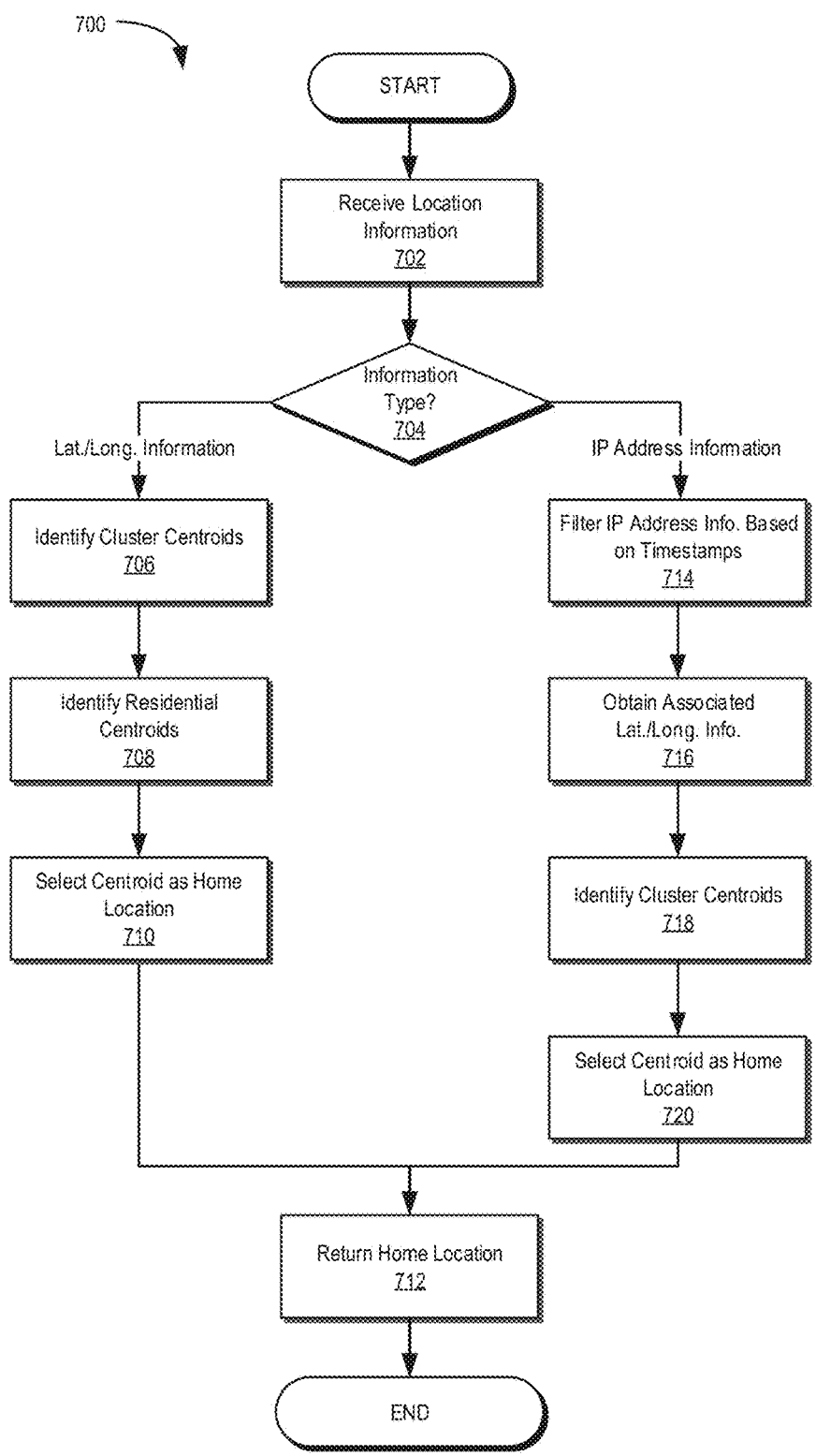
FIG. 7 illustrates a flow chart of an exemplary method for determining a point of interest associated with a user based on available location information consistent with embodiments of the present disclosure.

FIG. 7 illustrates a flow chart of an exemplary method 700 for determining a POI associated with a user based on available location information consistent with embodiments disclosed herein. The illustrated method 700 may be implemented in a variety of ways, including using software, firmware, hardware, and/or any combination thereof. In certain embodiments, the method 700 may be implemented by a trusted service and/or a user device as described above.

Location information may be received at 702 from an electronic device associated with a user by a trusted service. As discussed above, the location information may comprise latitude and/or longitude information obtained by a GPS and/or IP address information associated with a personal electronic device. The received location information may be analyzed at 704 to determine a type of location information included therein.

If the received location information comprises latitude and/or longitude information, centroids associated with location clusters determined based on location points associated with the received location information may be identified at 706. Upon identifying location cluster centroids, information relating to the centroids may be identified using one or more POI databases such as an OSM database and/or the like. For example, locations included in an OSM database may be compared with the location cluster centroids to identify centroids associated with residential locations at 708. If one such centroid is identified, the centroid may be identified as a home location of the user at 710 and returned at 712 for use in connection with updating a profile associated with the user. If multiple centroids are identified as residential locations, the centroid having the most location points in the associated location cluster may be identified as a home location of the user at 710 and returned at 712. In yet further embodiments, timestamp information associated with the location information may be used to identify a centroid as a home location of the user. For example, if the location information indicates a user is located proximate to particular centroid regularly during evening hours, it may be more likely that the centroid is a home location of the user.

If the received location information comprises IP address information, the method 700 may proceed to 714, where the IP address information may be filtered based on the associated timestamp information. For example, in connection with identifying a location of a user's home, the IP address information may be filtered to identify the IP address information obtained during evening hours when a user is more likely to be at their home.

Latitude and/or longitude information associated with the filtered IP address information may be obtained at 716 using an IP address database associating IP addresses with certain locations and/or areas such as, for example, a Maxmind database. Based on the obtained latitude and/or longitude information associated with the filtered IP address information, location clusters and associated centroids may be identified at 718. If one such centroid is identified, the centroid may be identified as a home location of the user at 720 and returned at 712 for use in connection with updating a user profile. If multiple centroids are identified, the centroid having the most location points in the associated location cluster may be identified as a home location of the user at 720 and returned at 712. In yet further embodiments, information obtained from a POI database may also be used in connection with identifying a centroid as a home location of the user.

In some embodiments, if the received location information comprises both latitude and/or longitude information and IP address information, the home location identified based on the latitude and/or longitude information may be returned as the home location of the user due to the relative accuracy of the latitude and/or longitude information. It will be appreciated that a variety of other methods may be utilized to identify a home location of the user device to be returned if the received location information comprises both latitude and/or longitude information and IP address information, including methods that weigh determinations based on the relative accuracy of the different types of location information.

As discussed above, in certain embodiments, POI information relating to centroids, which may comprise tags associated with particular latitudes and/or longitudes, may be identified using an OSM database. In certain embodiments, to simplify database queries, the database may be downloaded in a Postgis format and stored in PostgreSQL. In further embodiments, map reduce query methods may be used to query the database with reduced latency. In yet further embodiments, time information included in results obtained from certain database queries (e.g., POI database and/or IP address databases) may be shifted to account for certain time zone offsets between the results and location information received from the user device.

FIG. 8 illustrates identification of clustered locations associated with a user consistent with embodiments disclosed herein. As shown in FIG. 8 and described in detail above, received location information 600 may comprise spatio-temporal information. For example, the location information 600 may comprise information relating a plurality of location points with associated latitude and/or longitude information. The location information 600 may further comprise time information indicating a time at which a user and/or an associated device were located at a particular location point and/or a duration for which they remained at the point.

In certain embodiments, location points, $P_1, P_2, \ldots Pn$, identified based on the location information, may represent points along a path 804 traveled by the user. Location points within a certain area and/or range (e.g., $P_3$-$P_6$), may be associated with a particular location cluster 800 indicating that a user visited a particular location (e.g., the user's home, workplace, etc.). Consistent with embodiments disclosed herein, a centroid 802 and/or other specific location associated with the cluster may be identified and used to identify a POI associated with the user and/or other information relating to the user.

Clusters 800 may be identified in a variety of ways. For example, in certain embodiments, clusters 800 may be identified when a certain number of location points are within a certain relative distance from each other. In further embodiments, clusters 800 may be identified based on both spatial and temporal information. For example, in some embodiments, clusters 800 may be identified when a certain number of location points are within a certain relative distance from each other and temporal information associated with the location points indicates that the user remained at the associated location points for a certain period of time. In this manner, clusters 800 may be associated with location points that are not only close in distance, but also represent locations that the user remains at for a period of time (e.g., relatively non-transitory locations).

Figure 9:
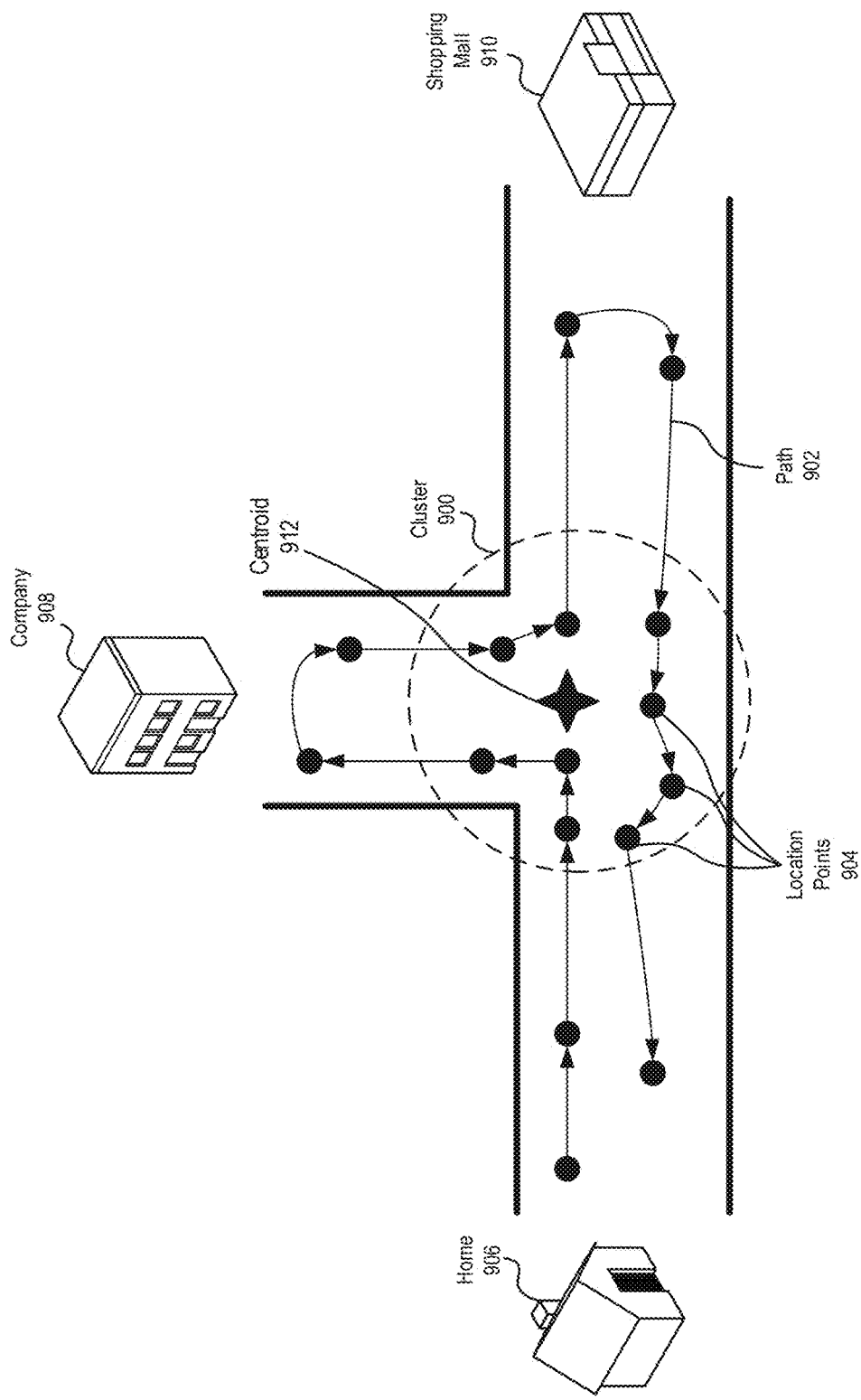
FIG. 9 illustrates identification of clustered locations on a user's path consistent with embodiments of the present disclosure.

FIG. 9 illustrates identification of clustered locations 900 on a user's path 902 consistent with embodiments disclosed herein. In some embodiments, certain clustered location points 904 may not be associated with a particular POI (e.g., a user's home 906, workplace 908, a shopping mall 910, and/or the like), but may represent an intermediate location that the user frequents during travels between POIs 906-910. Consistent with embodiments disclosed herein, a centroid 912 and/or other specific location of such an intermediate location cluster 900 may be identified, and may be used in connection with certain content and/or other information targeting activities. For example, content providers may be interested in targeting advertisements for delivery to the user at or near the identified centroid 912 based on the location being one the user frequents regularly and/or the like.

Figure 10:
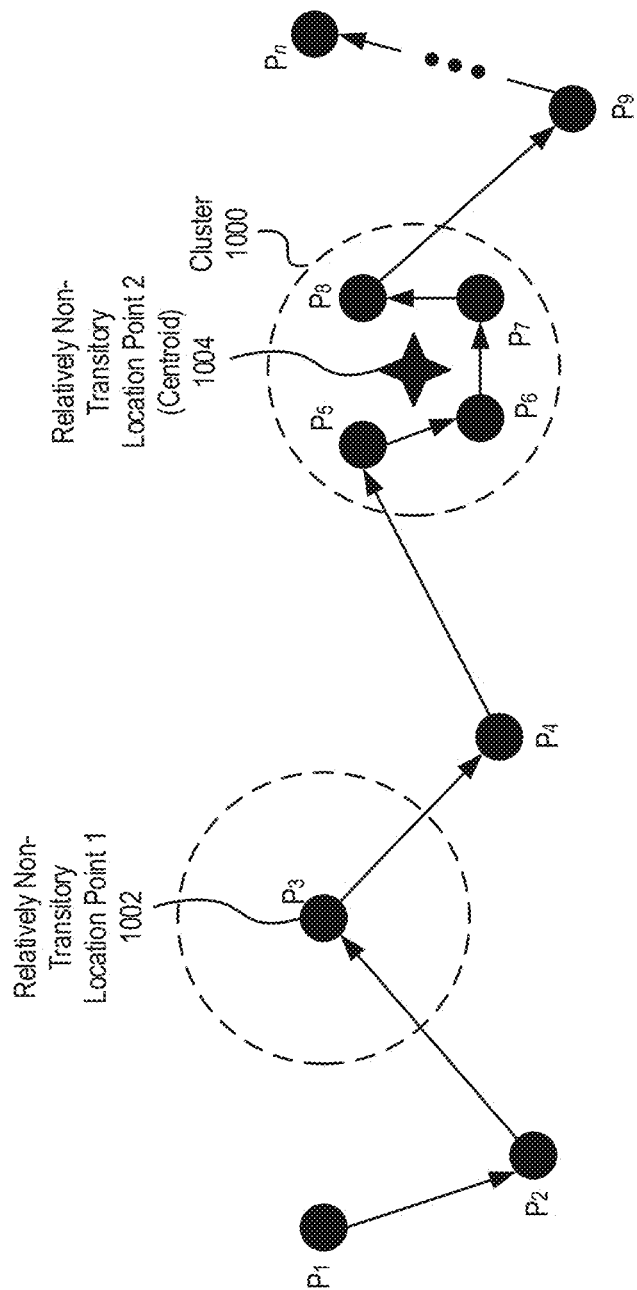
FIG. 10 illustrates identification of a plurality of location points associated with a user consistent with embodiments of the present disclosure.

FIG. 10 illustrates identification of a plurality of location points 1002, 1004 associated with a user consistent with embodiments of the present disclosure. As discussed above, one or more location points, $P_1, P_2, \ldots P_n$, may be identified based on location information associated with a user. In certain embodiments, certain locations of interest (e.g., location cluster 1000 and/or locations where a user remains for a certain period of time) may be identified based on spatial and/or temporal information. For example, based on location information, it may be determined that a user visits location point $P_3$ and remains in that location for more than a threshold period of time. The location point may thus be identified as a relatively non-transitory location point 1002, which may be of interest to a content provider in connection with information targeting activities.

In further embodiments, based on associated location information, a cluster 1000 associated with a plurality of location points may be identified. A centroid 1004 of the cluster 1000 may be identified as a relatively non-transitory location point based on the number of associated cluster 1000 data points and/or temporal information indicative of a time that the user spends at each of the associated data points. Consistent with certain disclosed embodiments, if multiple clusters and/or centroids are identified, a centroid having the most location points in the associated location cluster may be identified as a particular location of interest associated with the user (e.g., a home location of the user or the like.

Figure 11:
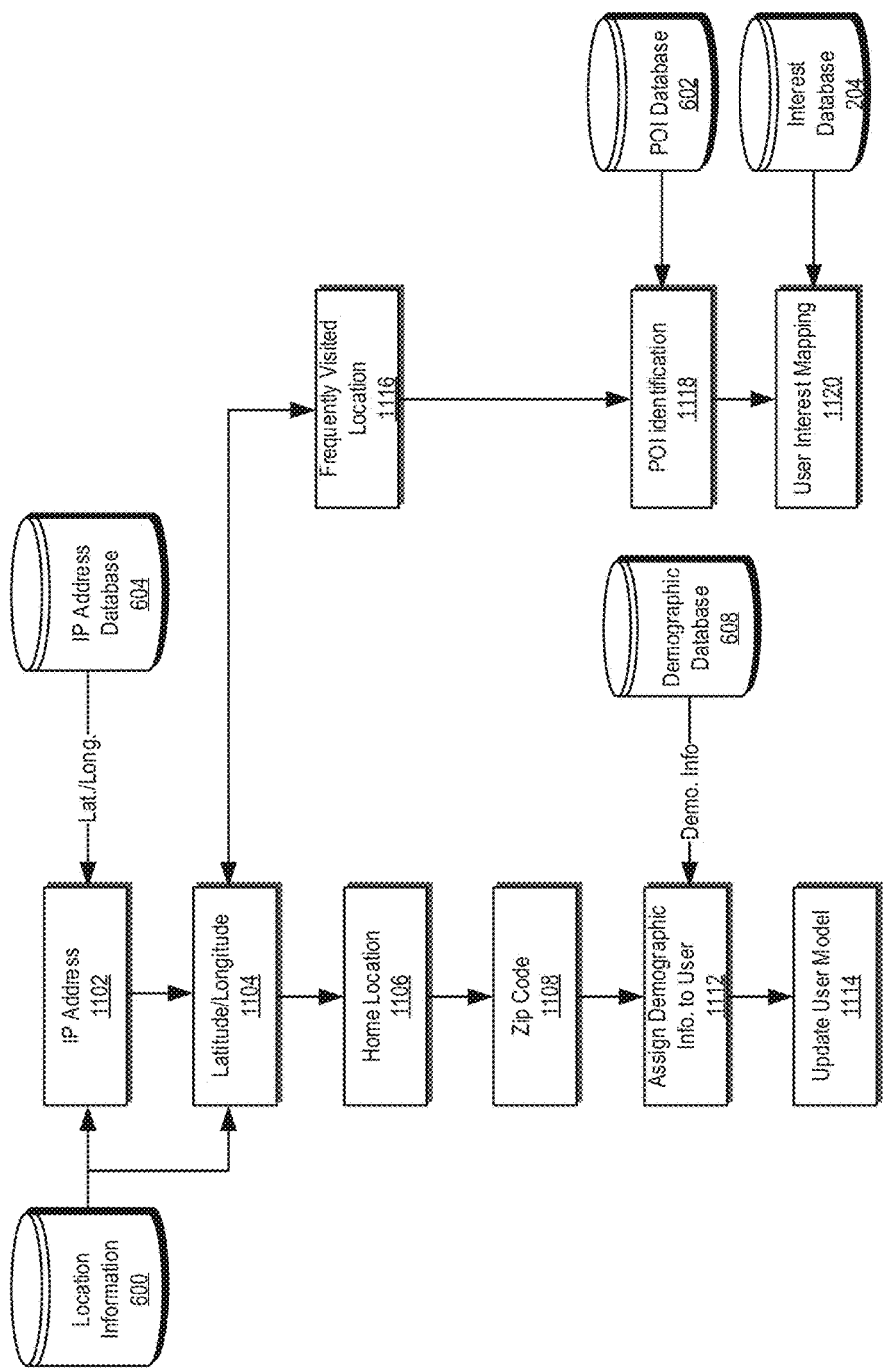
FIG. 11 illustrates a conceptual diagram of an exemplary method of mapping user interests based on location information consistent with embodiments disclosed herein.

FIG. 11 illustrates a conceptual diagram of an exemplary method of mapping user interests based on location information consistent with embodiments disclosed herein. The illustrated method may be implemented in a variety of ways, including using software, firmware, hardware, and/or any combination thereof. In certain embodiments, the method may be implemented by a trusted service and/or a user device as described above.

As shown, location information 600 comprising user location time series and/or spatio-temporal data may be received from one or more devices associated with a user. If the received location information comprises IP address information 1102, latitude and/or longitude information associated with the IP address information may be obtained using an IP address database 604 associating IP addresses with certain locations and/or areas such as, for example, a Maxmind database.

Based on the latitude and/or longitude 1104 (e.g., the latitude and/or longitude information included in the location information and/or derived from the IP address information), a home location of the user may be identified 1106 using embodiments of the disclosed methods. For example, a centroid of a cluster of associated location points may be identified and identified as a likely user home or residence. A zip code associated with the home location may be identified 1108 using, for example, a database associating one or more zip codes with one or more locations and/or areas. It will be appreciated that a variety of methods may be utilized to identify a zip code associated with a location.

In certain embodiments, based on the identified zip code, demographic information associated with the user may be identified and/or otherwise inferred and assigned to the user 1112. For example, based on the identified zip code and/or information obtained from one or more demographic databases 608 (e.g., databases including census data and/or other demographic data associated with zip codes and/or the like), a likely ethnicity of a user and/or income of the user may be determined and assigned to the user. As an example, demographic information may indicate that a particular zip code has a population having a certain ethnic composition. Based on the demographic information, the most prevalent ethnicity within the identified zip code may be assumed to be a likely ethnicity of the user. Similarly, demographic information may indicate that a particular zip code has a population having a certain income composition. Based on the demographic information, the most prevalent income within the identified zip code may be assumed to be a likely income of the user. In further embodiments, the relative composition of ethnicities, income, and/or other demographic attributes may be associated with the user, thereby providing an indication of a likelihood of the user having a particular demographic trait included in the composition. Among other things, such information may be used to improve a model associated with the user reflecting the user's traits and/or interests.

In certain embodiments, mapping a latitude and/or longitude to a known a zip code may comprise identifying a nearest known latitude and/or longitude associated with a particular zip code included in a database. In certain embodiments, to reduce the computational complexity of such a mapping operation, a 2-dimensional k-d tree data structure may be used in connection with searching the latitude and/or longitude and zip code information in a 2-dimension plane. For example, in some embodiments, a region of latitudes and/or longitudes may be divided into zones, and the nearest latitude and/or longitude having an associated zip code may be identified by searching the zones rather than the entire space.

The latitude and/or longitude information may further be used to identify frequently visited locations 1116 consistent with certain embodiments disclosed herein. POIs associated with the frequently visited locations may be identified 1118 using one or more POI databases 602 such as an OSM database and/or the like. In some embodiments, one or more user interests may be determined 1120 based on the identified POIs (e.g., using an interest taxonomy database 204 associating user interests and POIs).

Figure 12:
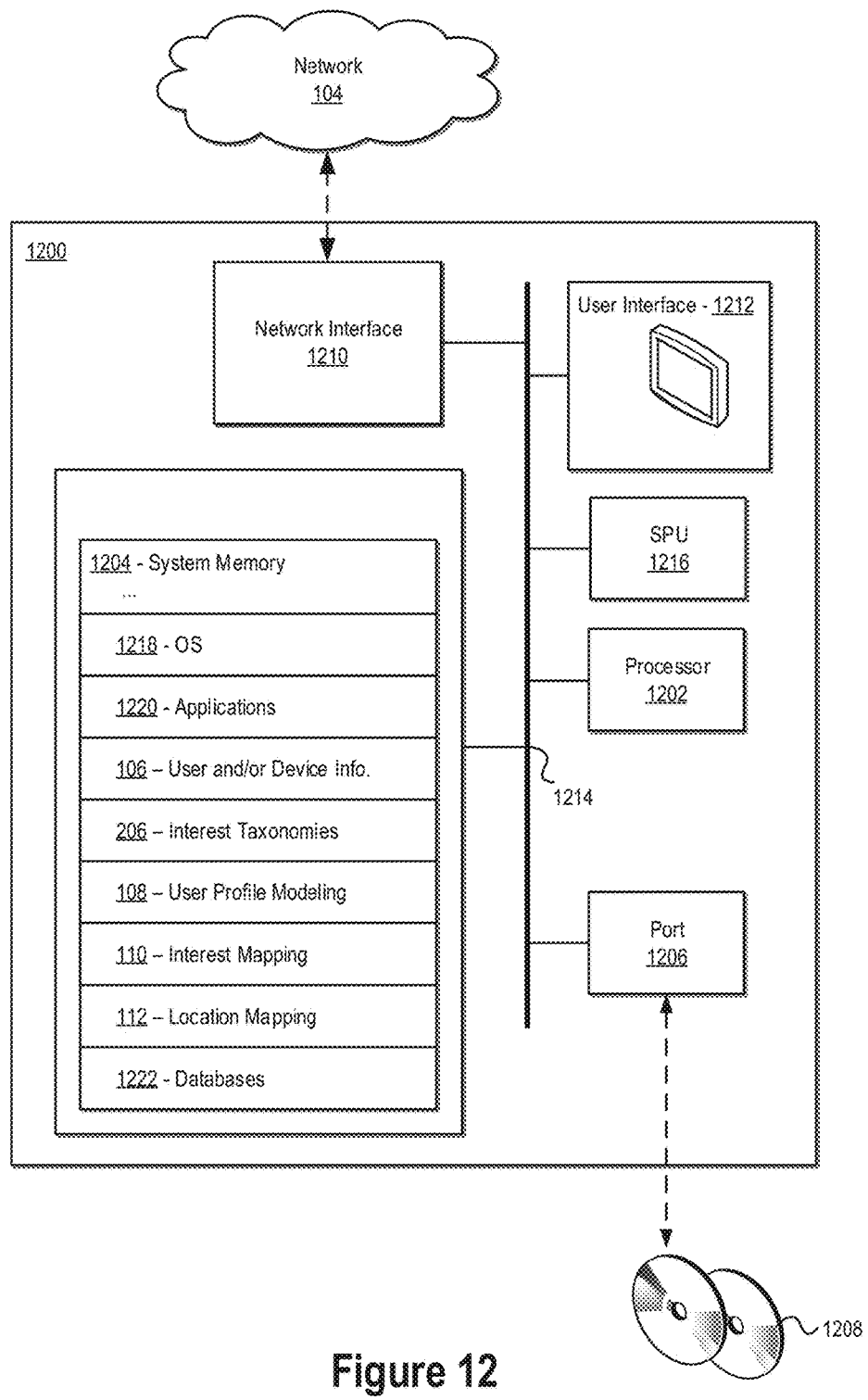
FIG. 12 illustrates a system that may be used to implement certain embodiments of the systems and methods of the present disclosure.

FIG. 12 illustrates a system 1200 that may be used to implement certain embodiments of the systems and methods of the present disclosure. The exemplary system 1200 may comprise a system and/or device associated with a user, a trusted service consistent with embodiments disclosed herein, and/or any other system configured to implement embodiments of the disclosed systems and methods. As illustrated in FIG. 12, the system 1200 may include: a processing unit 1202; system memory 1204, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 1202; a port 1206 for interfacing with removable memory 1208 that may include one or more diskettes, optical storage mediums, and/or other non-transitory computer-readable storage mediums (e.g., flash memory, thumb drives, USB dongles, compact discs, DVDs, etc.); a network interface 1210 for communicating with other systems via one or more network connections 104 using one or more communication technologies; a user interface 1212 that may include a display and/or one or more input/output devices such as, for example, a touchscreen, a keyboard, a mouse, a track pad, and the like; and one or more busses 1214 for communicatively coupling the elements of the system.

In some embodiments, the system may, alternatively or in addition, include an SPU 1216 that is protected from tampering by a user of the system or other entities by utilizing secure physical and/or virtual security techniques. An SPU 1216 can help enhance the security of sensitive operations such as personal information management, trusted credential and/or key management, privacy and policy management, versioning control and/or management, and other aspects of the systems and methods disclosed herein. In certain embodiments, the SPU 1216 may operate in a logically secure processing domain and be configured to protect and operate on secret information, as described herein. In some embodiments, the SPU 1216 may include internal memory storing executable instructions or programs configured to enable the SPU 1216 to perform secure operations, as described herein.

The operation of the system 1200 may be generally controlled by the processing unit 1202 and/or the SPU 1216 operating by executing software instructions and programs stored in the system memory 1204 (and/or other computer-readable media, such as removable memory 1208). The system memory 1204 may store a variety of executable programs or modules for controlling the operation of the system. For example, the system memory may include an operating system ("OS") 1218 that may manage and coordinate, at least in part, system hardware resources and provide for common services for execution of various applications and a trust and privacy management system for implementing trust and privacy management functionality including protection and/or management of personal data through management and/or enforcement of associated policies. The system memory may further include, without limitation, communication software configured to enable in part communication with and by the system; one or more applications 1220; user and/or device information 106; one or more interest taxonomies 206; one or more user profile modeling modules 108 (e.g., attribute modeling engines, determination engines, attribute models, interest mapping engines, etc.); one or more interest mapping modules 110 (e.g., application attribute information and/or interest mapping engines, etc.); one or more location mapping modules 112 (e.g., location determination engines, etc.); one or more databases 1222 storing information used in connection with the disclosed systems and methods (e.g., demographic databases, POI databases, IP address information databases, etc.); and/or any other information, modules, and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers, at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method performed by a system comprising a processor and a non-transitory computer-readable storage medium storing instructions that, when executed, cause the system to perform the method, the method comprising:
   receiving, at an interface of the system, application usage information from an electronic device associated with a user, the application usage information being associated with an application installed on the electronic device;
   mapping the application usage information to one or more interest taxonomies to identify one or more interests associated with the user;
   determining one or more relative adjusted weights associated with the identified one or more interests based on the application usage information, wherein determining the one or more relative adjusted weights comprises:
      determining one or more decay rates based an indication of a momentum associated with the application, the momentum being determined based on a first density of use of the application over a first time period and a second density of use of the application over a second time period, the second time period being longer than the first time period; and
      adjusting one or more initial relative weights based on the one or more decay rates to generate the one or more one or more relative adjusted rates;
   associating the one or more relative adjusted weights with the identified one or more interests to generate one or more weighted interests;
   identifying one or more content items based on the one or more weighted interests; and
   transmitting the one or more content items to the electronic device.

2. The method of claim 1, wherein mapping the application usage information to the one or more interest taxonomies comprises:
   identifying at least one application category associated with the application usage information; and
   mapping the at least one application category to the one or more interest taxonomies to identify the one or more interests associated with the user.

3. The method of claim 2, wherein identifying the at least one application category comprises deriving the at least one application category based on an available description of the application.

4. The method of claim 1, wherein the application usage information comprises at one or more of information indicating usage of the application on the electronic device, information indicating installation of the application on the electronic device, information indicating usage of particular application features on the electronic device, information indicating a time of usage of the application on the electronic device, information indicating a frequency of usage of the application on the electronic device, and information indicating a duration of usage of the application on the electronic device.

5. The method of claim 4, wherein the application usage information comprises time-series information.

6. The method of claim 5, wherein determining the one or more relative weights associated with the identified one or more interests comprises identifying usage events of the application within a defined time window based on the application usage information.

7. The method of claim 1, wherein the second time period comprises an installed lifetime of the application.

8. The method of claim 1, wherein the indication of the momentum associated with the application is based on a regularity of use of the application.

9. The method of claim 1, wherein the indication of the momentum associated with the application is based on a recency of use of the application.

10. The method of claim 1, wherein the indication of the momentum associated with the application is based on a pattern of use of the application.

\* \* \* \* \*